United States Patent
Raghavan et al.

(10) Patent No.: US 10,761,971 B2
(45) Date of Patent: Sep. 1, 2020

(54) METHOD AND DEVICE FOR AUTOMATING TESTING BASED ON CONTEXT PARSING ACROSS MULTIPLE TECHNOLOGY LAYERS

(71) Applicant: WIPRO LIMITED, Bangalore (IN)

(72) Inventors: Girish Raghavan, Chennai (IN); Selvan Nagaraja, Bangalore (IN); Ganesh Narayan, Bangalore (IN); Thamilchelvi Peterbarnabas, Chennai (IN)

(73) Assignee: Wipro Limited, Bangalore (IN)

( * ) Notice: Subject to any disclaimer, the term of this patent is extended or adjusted under 35 U.S.C. 154(b) by 251 days.

(21) Appl. No.: 15/941,010

(22) Filed: Mar. 30, 2018

(65) Prior Publication Data
US 2019/0251016 A1    Aug. 15, 2019

(30) Foreign Application Priority Data
Feb. 15, 2018  (IN) .............................. 201841005893

(51) Int. Cl.
*G06F 11/36*    (2006.01)
(52) U.S. Cl.
CPC ...... *G06F 11/3664* (2013.01); *G06F 11/3672* (2013.01); *G06F 11/3684* (2013.01); *G06F 11/3688* (2013.01)
(58) Field of Classification Search
CPC ............. G06F 11/3664; G06F 11/3672; G06F 11/3684; G06F 11/3688
See application file for complete search history.

(56) References Cited

U.S. PATENT DOCUMENTS

| 2014/0123114 A1* | 5/2014 | Navalur | G06F 11/3688 717/127 |
| 2015/0227452 A1* | 8/2015 | Raghavan | G06F 11/3684 717/124 |
| 2015/0324274 A1* | 11/2015 | Raghavan | G06F 11/3684 717/124 |
| 2016/0188450 A1* | 6/2016 | Appusamy | G06F 11/3664 714/38.1 |

OTHER PUBLICATIONS

European Search Report and Opinion, dated Oct. 26, 2018.*

* cited by examiner

*Primary Examiner* — Paul Contino
(74) *Attorney, Agent, or Firm* — Finnegan, Henderson, Farabow, Garrett & Dunner, LLP

(57) ABSTRACT

A method and device for automating testing based on context parsing across multiple technology layers is disclosed. The method includes clustering a plurality of test instructions into a plurality of technology groups based on an analysis of the plurality of test instructions. The method further includes creating an automation component for a set of test instructions in each of the plurality of technology groups, based on actions and objects in an associated set of test instructions. Further, the method includes identifying for each technology group a context information to be passed from an automation component associated with a technology layer to a downstream automation component associated with a succeeding technology layer, based on Natural Language Processing of the plurality of test instructions, and executing testing of the application based on the automation component and the associated context information.

13 Claims, 6 Drawing Sheets

METHOD AND DEVICE FOR AUTOMATING TESTING BASED ON CONTEXT PARSING ACROSS MULTIPLE TECHNOLOGY LAYERS

TECHNICAL FIELD

This disclosure relates generally to test automation, and more particularly to method and device for automating testing based on context parsing across multiple technology layers.

BACKGROUND

Various digital applications have found wide acceptance and implementation across various domains owing to the enhanced flexibility and ease of working. A business process may be implemented by various digital applications operating across different and fragmented open source technology layers. As a result, validation of a business scenario may require to traverse through these diverse technology layers. Automation of such business processes, therefore, requires handling of context passing from one technology layer to another. However, a seamless execution of seamless automation of a business process may be affected by various challenges associated with handling the context passing from one technology layer to another.

SUMMARY

In one embodiment, a method for automating testing of an application across a plurality of technology layers is described. The method includes clustering a plurality of test instructions into a plurality of technology groups based on an analysis of the plurality of test instructions, such that each technology group in the plurality of technology groups is associated with a technology layer from the plurality of technology layers. The method further includes creating an automation component for a set of test instructions in each of the plurality of technology groups, based on actions and objects in an associated set of test instructions. Further, the method includes identifying for each technology group a context information to be passed from an automation component associated with a technology layer to a downstream automation component associated with a succeeding technology layer, based on Natural Language Processing (NLP) of the plurality of test instructions, and executing testing of the application based on the automation component created for each technology group and an associated context information to be passed to the downstream automation component.

In another embodiment, a testing automation device for testing of an application across a plurality of technology layers is disclosed. The testing automation device includes a processor; and a memory communicatively coupled to the processor, wherein the memory stores processor instructions, which, on execution, causes the processor to cluster a plurality of test instructions into a plurality of technology groups based on an analysis of the plurality of test instructions, wherein each technology group in the plurality of technology groups is associated with a technology layer from the plurality of technology layers; create an automation component for a set of test instructions in each of the plurality of technology groups, based on actions and objects in an associated set of test instructions; identify for each technology group a context information to be passed from an automation component associated with a technology layer to a downstream automation component associated with a succeeding technology layer, based on NLP of the plurality of test instructions; and execute testing of the application based on the automation component created for each technology group and an associated context information to be passed to the downstream automation component.

In yet another embodiment, a non-transitory computer-readable storage medium is disclosed. The non-transitory computer-readable storage medium has instructions stored thereon, a set of computer-executable instructions causing a computer comprising one or more processors to perform steps comprising clustering, by a testing automation device, a plurality of test instructions into a plurality of technology groups based on an analysis of the plurality of test instructions, wherein each technology group in the plurality of technology groups is associated with a technology layer from the plurality of technology layers; creating, by the testing automation device, an automation component for a set of test instructions in each of the plurality of technology groups, based on actions and objects in an associated set of test instructions; identifying for each technology group, by the testing automation device, a context information to be passed from an automation component associated with a technology layer to a downstream automation component associated with a succeeding technology layer, based on NLP of the plurality of test instructions; and executing, by the testing automation device, testing of the application based on the automation component created for each technology group and an associated context information to be passed to the downstream automation component.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
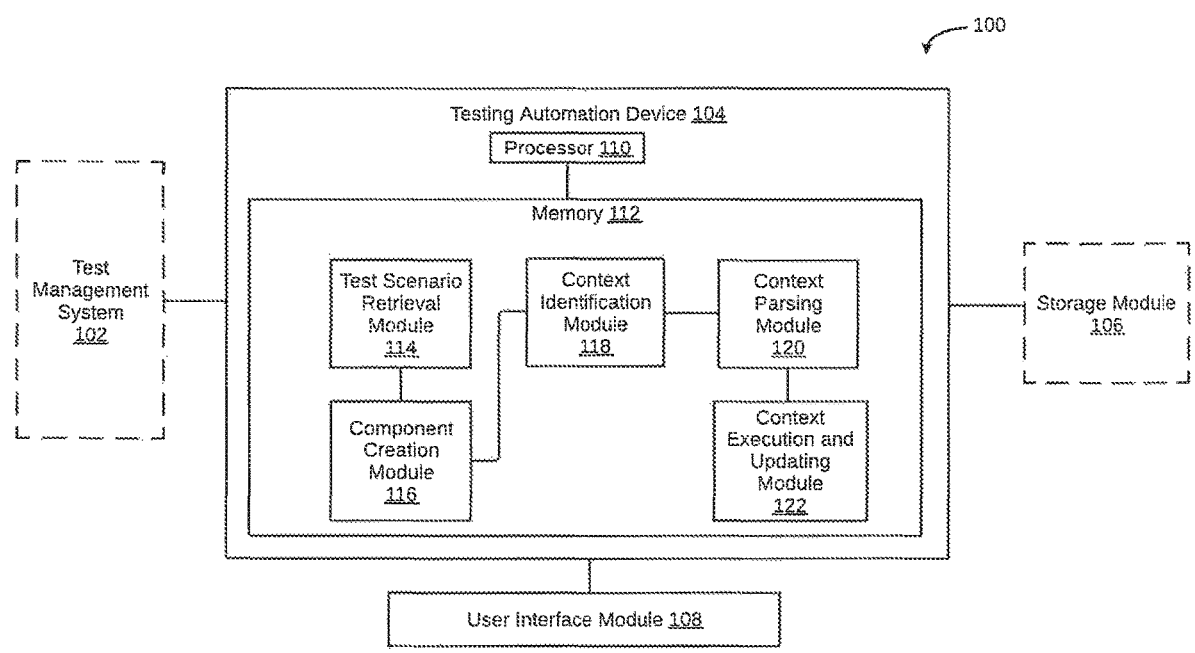
FIG. 1 is a block diagram illustrating a system for automating testing of an application across a plurality of technology layers, in accordance with an embodiment.

In one embodiment, a system 100 for automating testing of an application across a plurality of technology layers is illustrated in the FIG. 1. Each of the plurality of technology layers may correspond to a particular technology from a plurality of technologies. By way of an example, the plurality of technologies may include, but are not limited to mobiles, web services, database mainframe, or desktop. The system 100 may include a test management system 102, a testing automation device 104, a storage module 106, and a user interface module 108.

The test management system 102 may be selected from conventionally known commercially available tools, such as, HP™ Quality Center, or from conventionally known open source tools, such as Testlink. It will be apparent to a person skilled in the art that the test management system 102 may be selected from any other testing tool that is capable of storing test automation scripts and allows external retrieval of test scenarios or test cases, which include a plurality of test instructions. The test management system 102 may be communicatively coupled to the testing automation device 104, via an interface that may be a web service based interface and may enable the testing automation device 104 to retrieve data, such as, test scenarios or test cases from the test management system 102. The interface allows the testing automation device 104 to connect to multiple such test management systems, without requiring to change the interface specification.

The testing automation device 104 may include a processor 110 that is communicatively coupled to a memory 112. The memory 112 stores processor instructions, which on execution cause the processor 110 to automate testing of an application across the plurality of technology layers. The memory 112 may be a non-volatile memory or a volatile memory. Examples of the non-volatile memory, may include, but are not limited to a flash memory, a Read Only Memory (ROM), a Programmable ROM (PROM), Erasable PROM (EPROM), and Electrically EPROM (EEPROM) memory. Examples of the volatile memory may include, but are not limited Dynamic Random Access Memory (DRAM), and Static Random-Access memory (SRAM).

The memory 112 may further include various modules, such as a test scenario retrieval module 114, a component creation module 116, a context identification module 118, a context parsing module 120, and a context execution and updating module 122. The test scenario retrieval module 114 may retrieve test scenarios (which includes a plurality of test instructions) from the test management system 102. Upon receiving the test scenarios, the test scenario retrieval module 114 may forward the test scenarios to the component creation module 116, which clusters the plurality of test instructions into a plurality of technology groups based on an analysis of the plurality of test instructions. Each technology group in the plurality of technology groups is associated with a technology layer from the plurality of technology layers. In other words, the component creation module 116 allows for identifying and segregating the plurality of technology layers, such as, a web technology layer, a mobile technology layer, a web services technology layer, a database mainframe technology layer, and a desktop technology layer. This is further explained in detail in conjunction with FIG. 2 and FIG. 3.

Additionally, the component creation module 116 creates an automation component for a set of test instructions (from within the plurality of instructions) in each of the plurality of technology groups. The automation component may be created based on actions and objects in an associated set of test instructions. In other words, an individual automation component may be created for each technology layer in the plurality of technology layers. An automation component may refer to test instructions for performing a specific task on a single technology layer.

By way of an example, an automation component may correspond to test instructions that may include logging into a web application using a user name and a password. By way of another example, an automation component may correspond to test instructions that may include logging into a mobile application on a mobile device (which implements an operating system, for example, Android, iOS and Windows) using a user ID and a password. This is further explained in detail in conjunction with FIG. 2 and FIG. 4. After creating the automation components, the component creation module 116 may pass the automation components to the context identification module 118.

The context identification module 118 may identify for each technology group a context information to be passed from an automation component associated with a technology layer to a downstream automation component associated with a succeeding technology layer. The context information may be identified based on Natural Language Processing (NLP). In other words, a context information of an automation component that is to be passed at the boundary of each technology layer is identified. In an embodiment, the context information may refer to the information that may be generated as output from one module (associated with an automation component), and which may be used by a succeeding module (associated with a downstream automation component). By way of an example, while generating an order through one component, the order number may be the context information, which might be used in the next technology layer. This is further explained in detail in conjunction with FIG. 2 and FIG. 5.

The context identification module 118 then passes the context information to the context parsing module 120, which may be configured to parse the context information. Based on parsing, the context parsing module 120 may extract context value that is to be used for passing from one technology layer to another. This is further explained in detail in conjunction with FIG. 5.

The context execution and updating module 122 may receive the context value from the context parsing module 120. Based on the context value, the context execution and updating module 122 may execute testing of the application. In other words, the context execution and updating module 122 enables execution of automation scripts based on the context value. The context execution and updating module 122 may further update the test management system 102 with results of executing the automation scripts. This is further explained in detail in conjunction with FIG. 2 and FIG. 5. The modules in the testing automation device 104 are communicatively coupled to each other via one or more connectors that may be implemented as an Application Programming Interface (API).

The testing automation device 104 may further be communicatively coupled to the storage module 106, via an interface, which may be a web service based interface. The storage module 106 may store templates and information related to creation of test instructions into automation components. This information may further include details related to how a specific technology layer instructions get mapped to an automation component. The information may also include meta-data information, such as, Keywords and NLP information.

A user (for example, an administrator) may interact with the testing automation device 104 through the user interface module 108 that is communicatively coupled to the testing automation device 104, via an interface, which may be a web based interface. The user interface module 108 provides an interface to the user to confirm automation actions and perform necessary changes to automation steps, such as, addition of negative scenarios or adding test data to the automation steps.

Figure 2:
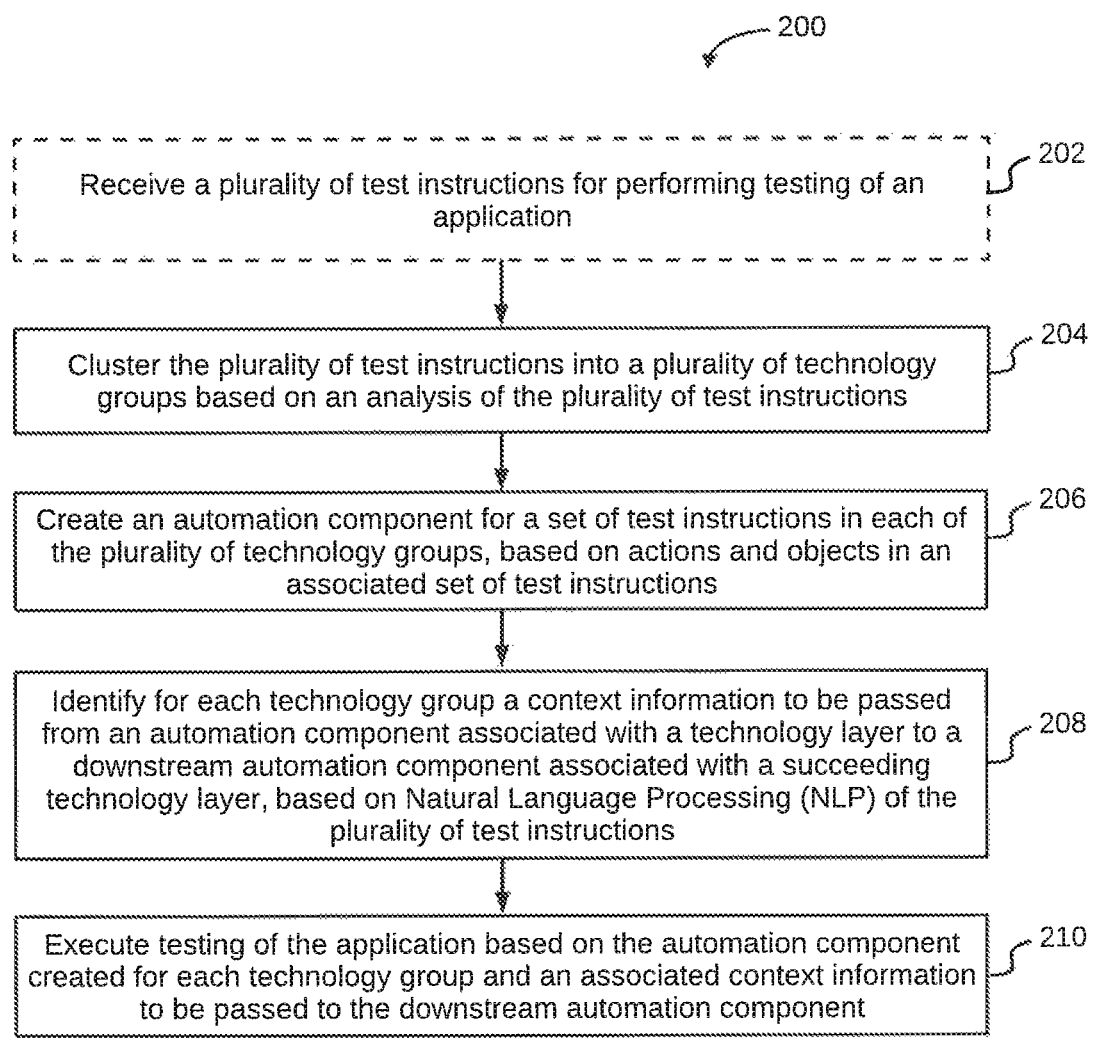
FIG. 2 illustrates a flowchart of a method for automating testing of an application across a plurality of technology layers, in accordance with an embodiment.

Referring now to FIG. 2, a flowchart of a method 200 for automating testing of an application across a plurality of technology layers is illustrated, in accordance with an embodiment. The plurality of technology layers may include, but are not limited to, web technology layer, mobile technology layer, web services technology layer, database mainframe technology layer, and desktop technology layer.

At step 202, the testing automation device receives a plurality of test instructions for performing testing of the application. Each of the plurality of test instructions may include one or more actions and one or more objects. The plurality of test instructions may be received in the form of test scenarios. In a test scenario, test instructions may be sequenced one after the other, such that each test instruction includes one or more actions and one or more objects. Thus, a test scenario may include different actions that may be performed on various objects in the application. Actions and objects within a test instruction may be identified and separated based on the difference in the actions and the objects. By way of an example, a test instruction may be: "entering a user ID and a password in a login screen," the actions and objects may be identified as:

Entering a user ID
Entering a password
Clicking on Login

In the above example, the words, such as, "Entering" and "Clicking" are identified as actions, while the words, "user ID," "password," and "Login" are identified as objects. In an embodiment, the actions and objects, may be identified using NLP or a keyword store in the storage module. The keyword store may be regularly updated as and when new keywords (associated with actions and objects) are introduced.

At step 204, the testing automation device may cluster the plurality of test instructions into a plurality of technology groups. Each technology group in the plurality of technology groups may be associated with a technology layer. The clustering may be performed based on an analysis of the plurality of test instructions. The method of clustering is further explained in detail in conjunction with FIG. 3 and FIG. 4.

Once the plurality of instructions are clustered, the testing automation device, at step 206, creates an automation component for a set of test instructions in each of the plurality of technology groups. In other words, one automation component may be created for each technology layer, as a technology group corresponds to a technology layer. The automation component may be created based on actions and objects in an associated set of test instructions. In other words, actions and objects identified for each test instruction in a given set of test instructions are converted into automation components.

By way of an example, for creating automation components, a list of keywords (which is not limiting) for actions, which may be associated with one or more of the plurality of technology layers, i.e., web, Database (DB), services/micro-services, mainframe, and mobile, is provided below. The predefined keywords for actions may be stored in the keyword store in a corpus repository and more keywords may be continuously added to the corpus repository as and when new testing is performed. In an embodiment, actions within a test instruction may be identified based on NLP.

Web:
  Based on keywords, such as, click, edit, or select, etc., the web related actions get segregated and actions for the automation component get defined.
Database:
  Keywords include: DB connection, query formation, query execution, result analysis, comparison.
  Based on these keywords, DB related activities, such as, connecting to a database, forming a SQL query, executing the query, etc., the pure play Relational Database Management System (RDBMS) or non-RDBMS specific databases, the DB related actions get segregated.
Services/Micro-Services:
  Keywords include: API formation (Representational State Transfer (REST)/Simple Object Access Protocol (SOAP)/any other), request creation, receiving response, analysis of response, validation (if any)—such as accessing of REST/SOAP end-points, performing a service call, receiving XML response, etc. for specific service related actions, such as invoking a service, receiving and parsing responses, etc.
Mainframe:
  Keywords include: connection to mainframe, execution of commands or jobs, and analysis of results.
Mobile:
  Keywords include: connection to real/emulated devices, execute scripts using keywords/actions & objects.
  [To the Inventors: We are not clear on whether the above examples list down the keywords or "Automation components" that may be generated based on the keywords that are identified as actions]

Once an action in a test instruction within a set of instructions is identified, the corresponding object for that action is also identified in order to create an automation component. By way of an example, actions in the set of instructions, for which an automation component would be created, relates to "logging in to a web application, using input/edit actions for a user ID and password." In this case, the objects corresponding to the actions may be identified as depicted below:
  1. Enter user ID inside the userID object in the web page.
  2. Enter password inside the password, object in the web page.
  3. Click on the Submit button object in the web page.

In the above example, "Enter" and "Click" constitute actions and the underlined words, i.e., "userID," "password," and "submit" constitute objects corresponding to the actions. In an embodiment, objects corresponding to actions within a test instruction may be identified based on NLP. Thus, the combination of object and action together may form a test automation instruction. The test automation instruction may be executed by any underlying test automation tool. As mentioned earlier, the test automation tools may be selected from any of the commercial tools, such as MicroFocus UFT™, IBM™ and RFT™, and from open source tools like Selenium. A set of automation instructions may be created into a uniquely executable automation component.

Once an automation component is created for each technology layer (for example, web, web services, database, mainframe, and mobile), at step 208, the testing automation device identifies, for each technology group, a context information to be passed from an automation component associated with a technology layer to a downstream automation component associated with a succeeding technology layer. In an embodiment, the context information may be identified using NLP of the plurality of test instructions. The context information may be identified and recorded dynamically. As different technology layers may exist independent of each other, for automating a test scenario, technology layers maybe required to be combined together in a sequence based on the context information, such that, a flow from one technology layer to a succeeding technology layer is created. Further, the context information may be created in form of a storage module that may be accessed by the subsequent technology layers. The context information may be picked by an automation tool for automating the testing of the application.

Thereafter, at step 210, the testing automation device executes the testing of the application based on the automation component created for each technology group and an associated context information to be passed to the downstream automation component. In other words, once the context information is identified, the automation script is then executed by using one of the automation tools as selected by a user. As the context information is updated across the plurality of technology layers, the execution information is captured seamlessly, and the automation components are executed one after the other. The automation components may be executed by different automation tools depending upon the technology layer identified. Once the testing is complete, the test results may be updated and stored in the test management system. Further, the context information and values may also be updated seamlessly as the test instructions are completed across the automation components and are stored in the test management system.

Figure 3:
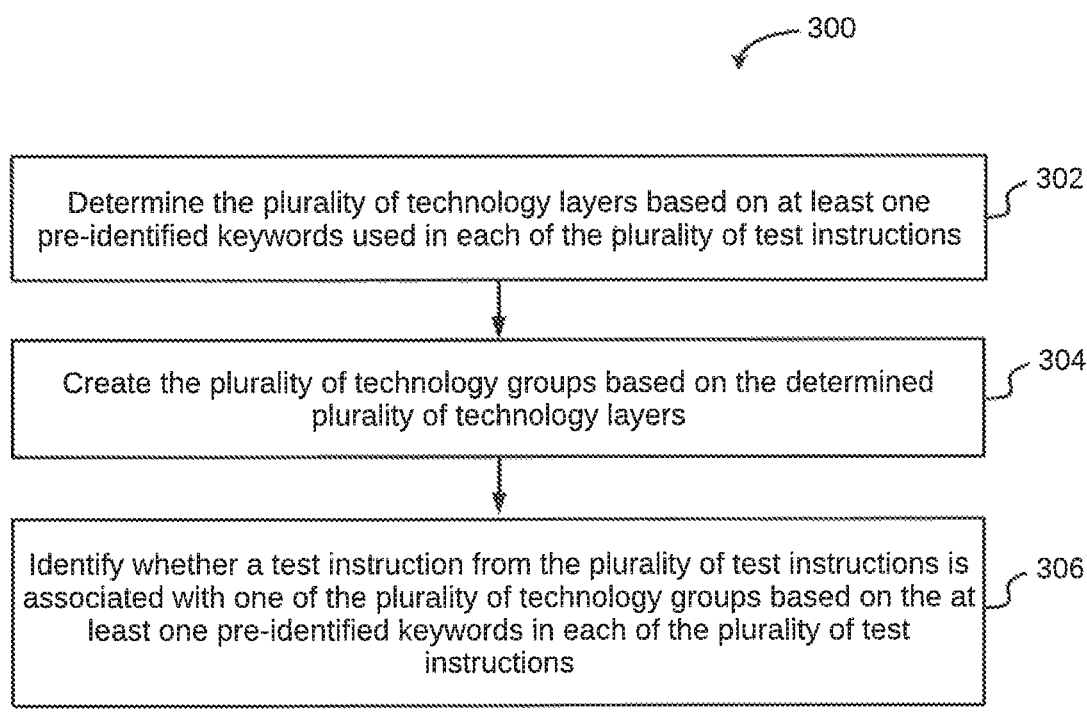
FIG. 3 illustrates a flowchart of a method for clustering a plurality of test instructions into a plurality of technology groups, in accordance with an embodiment.

Referring to FIG. 3, a flowchart of a method 300 for clustering a plurality of test instructions into a plurality of technology groups is illustrated, in accordance with an embodiment. At step 302, the plurality of technology layers are determined based on one or more pre-identified keywords used in each of the plurality of test instructions. The one or more pre-identified keywords may be stored in a technology keyword store that is stored and regularly updated in the storage module. The technology keyword store may get updated, as and when new technologies get introduced. In an embodiment, the NLP may also be used to determine the plurality of technology layers.

Technology layers that are already identified, for example, may include, but are not limited to web (browser), web service, SAP, Oracle, desktop (thick client), database, mobile, and mainframe. Thus, one or more pre-identified keywords may include the following keywords: web browser, web page, mobile device, mainframe, and databases. Based on these pre-identified keywords, the plurality of technology layers may then be identified for the plurality of instructions, By way of an example, the identification of plurality of technology layers from a few test instructions is depicted below:

1. Enter user id & password on a web browser and click on submit.
2. Submit the order on the web page.
3. On successful submission, open the App on a Mobile device, to check the status of the order.
4. Using a Mainframe client, approve the order.
5. Check the backend Database if status is approved.

The pre-identified keywords, i.e., web browser, web page, mobile device, mainframe, and databases, are searched from the test instructions given above in order to determine the relevant technology layers. Based on the search, the following four technology layers are determined: Web, Mobile, Mainframe, and Database.

Based on the plurality of technology layers determined at step 302, a plurality of technology groups are created at step 304. In continuation of the example above, the following four technology groups are created: a web technology group, a mobile technology group, a mainframe technology group, and a database technology group. Thus, each group is associated with a technology layer.

After the plurality of technology groups are created, each of the plurality of test instructions may be analyzed to identify whether a test instruction from the plurality of test instructions is associated with one of the plurality of technology groups or not, at step 306. To this end, one or more pre-identified keywords are identified in each of the plurality of test instructions. When a pre-identified keyword linked to a technology group is identified in a test instruction, that test instruction is clustered in that technology group.

Accordingly, the plurality of test instructions may be clustered in the plurality of technology groups, as explained in step 204. In continuation of the example above, a technology group associated with each of the test instruction is identified. Based on the following pre-identified keywords: web browser, web page, mobile device, mainframe, and databases, the test instructions 1 and 2 are bucketed in the web technology group, the test instruction 3 is bucketed in the mobile technology group, the test instruction 4 is bucketed in the mainframe technology group, and the test instruction 5 is bucketed in the database technology group.

Figure 4:
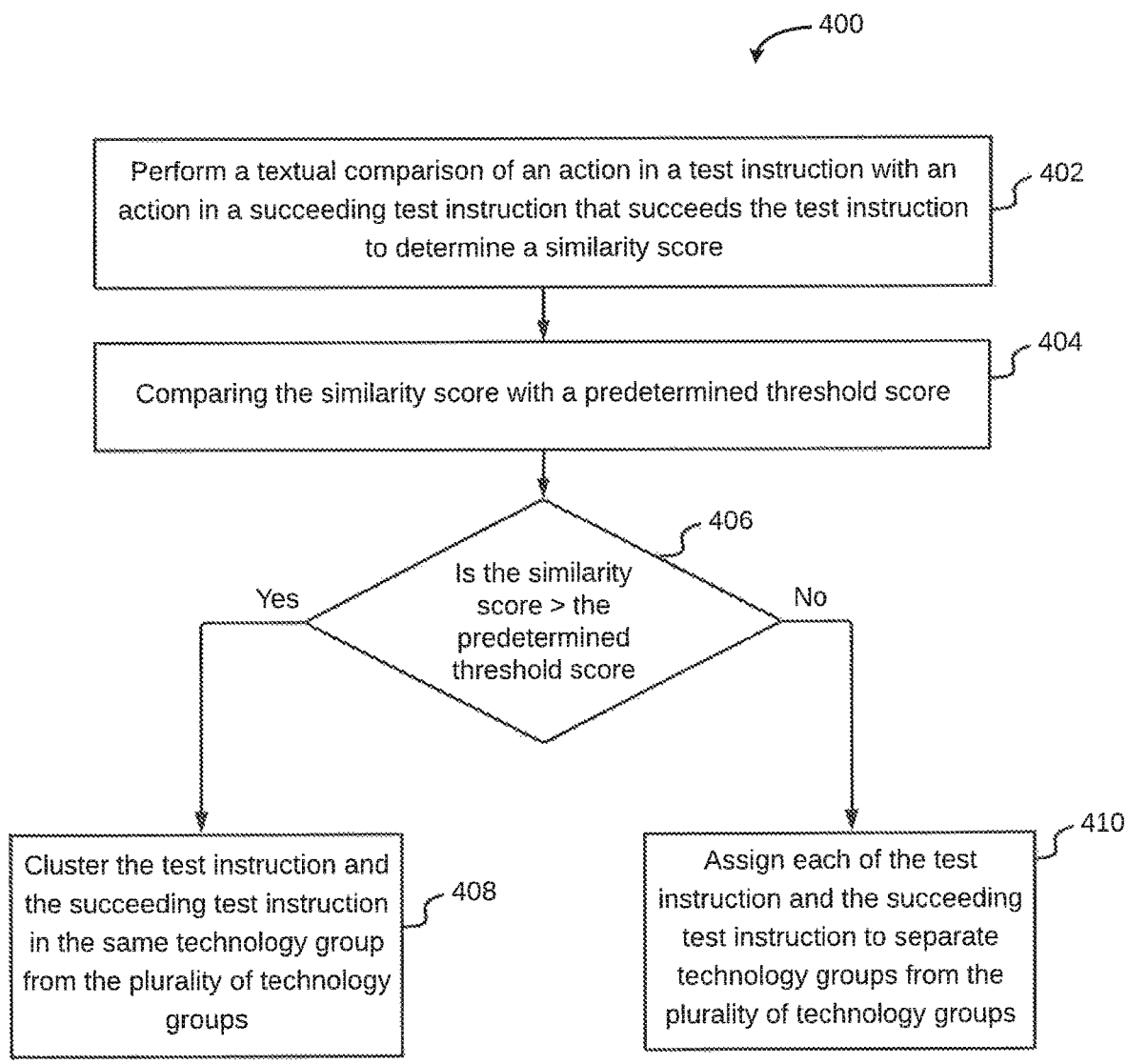
FIG. 4 illustrates a flowchart of a method of analyzing the plurality of test instructions for clustering, in accordance with an embodiment.

Referring now to FIG. 4, a flowchart of a method 400 flowchart of a method of analyzing the plurality of test instructions for clustering is illustrated, in accordance with an embodiment. A test scenario retrieved from the test management system 102, includes a plurality of test instructions in a predefined sequence, such that, a given test instruction is succeeded by another test instruction. Referring back to FIG. 2, once one or more actions and one or more objects in a test instruction are identified, at step 402, a textual comparison of an action in the test instruction is performed with an action in a succeeding test instruction that succeeds the test instruction. Based on the textual comparison, a similarity score is determined for the test instruction and the succeeding test instruction. In other words, two consecutive test instructions are textually compared in order to identify similarity among them. By way of an example, for the textual comparison of an action, all words that are associated with the action may be utilized for determining the similarity score.

At step 404, the similarity score is compared with a predetermined threshold score. At step 406, a check is performed to determine whether the similarity score is greater than the predetermined threshold score. When the similarity score is greater, at step 408, the test instruction and the succeeding test instruction are clustered in the same technology group from the plurality of technology groups. By way on an example, the predetermined threshold score may be 80% and the similarity score for two consecutive test instructions is 90%, thus both these test instructions would be clustered in one technology group.

Referring back to step 406, if the similarity score is less than the predetermined threshold score, each of the test instruction and the succeeding test instruction are assigned to separate technology groups from the plurality of technology groups at step 410, The method 400 is repeated for each test instruction in the plurality of test instructions. As a result, when the method 400 is executed for the last test instruction, the plurality of test instructions are clustered into the plurality of technology groups. In other words, the plurality of test instructions are segregated across the plurality of technology layers. The above process facilitates automation of a particular technology layer which suits a particular tool. By way of an example, segregation of actions in multiple test instructions across the following technology layers: Web, mobile, mainframe, and database, is depicted below:

Technology Layer: Web
   1. Using the web page, perform login using user id & password.
   2. Submit the order on the web page.
Technology Layer: Mobile
   1. Check the status of the order.
Technology Layer: Mainframe
   1. Approve the order using a mainframe client.
Technology Layer: Database
   1. Check the database if the order is approved.

Thereafter, one automation component is created for the test instructions clustered in each technology group or technology layer. In continuation of the example above, four automation components may be created, such that one automation component is created for each of the web technology layer, the mobile technology layer, the mainframe technology layer, and the database technology layer. This has been explained in detail in conjunction with FIG. 2.

Figure 5:
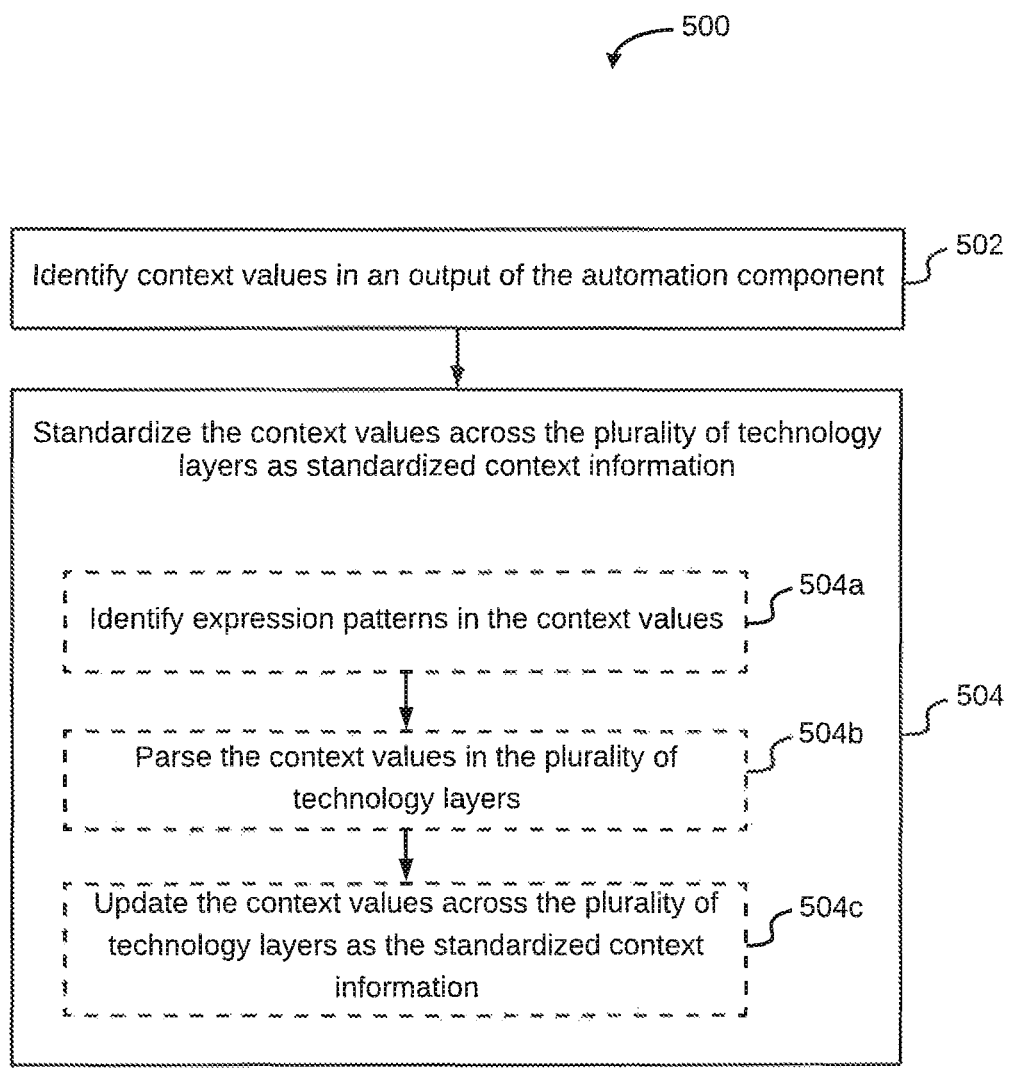
FIG. 5 illustrates a flowchart of a method for identifying context information to be passed from an automation component associated with a technology layer to a downstream automation component associated with a succeeding technology layer, in accordance with an embodiment.

Referring now to FIG. 5, a flowchart of a method 500 for identifying the context information to be passed from an automation component associated with a technology layer to a downstream automation component associated with the succeeding technology layer is illustrated, in accordance with an embodiment. It will be apparent to a person skilled in the art that the method 500 will be performed for each automation component created for the plurality of technology groups (or technology layers). At step 502, one or more context values are identified in an output of the automation component. The context values may be identified using NLP techniques to obtain information about combining a technology layer to the succeeding technology layer.

The identification of the context value is depicted by way of an exemplary embodiment involving a Unique Order ID generated in a test scenario. In this exemplary embodiment, an output of a particular action from an automation component is identified. This may be accomplished by identifying keywords, such as, "Successful creation of an Order." The words may be identified using a corpus of words that may be regularly collected and updated in the storage module. Thereafter, a context value may be identified using reference patterns, for example, a reference pattern: "FMP--99-." This reference pattern may denote a standard format of an Order ID generated. Following this, test instructions in the downstream automation component that may utilize the context value is identified. The test instructions may be identified by identifying the context value using the keyword search. By way of an example, the same be accomplished by searching for words, such as, "Enter Order ID derived from previous step," in the downstream automation component. A combination of two or more related words, such as "Order ID" may form a context value that is passed from one automation component to another. This process may be repeated multiple times to identify all context values.

Thereafter, at step 504, the identified context values are standardized across the plurality of technology layers as standardized context information. To this end, at step 504a, expression patterns are identified in the context values. By way of an example, a reference pattern: "FMP--99-" may be identified as expression pattern for an "Order ID." In an embodiment, the expression pattern may be identified by performing a pattern search using one of the conventionally known programs, such as, Perl. At step 504b, the context values is parsed in the plurality of technology layers. Thereafter, at step 504c, the context values are updated across the plurality of technology layers as the standardized context information. In continuation of the example given at step 502, the Order ID value of the form "FMP--99-" may be converted into the standardized context information, such as "Order ID". This standardized context information "OrderID" may be used by the underlying automation script to reference the value obtained directly during execution of a test case.

Figure 6:
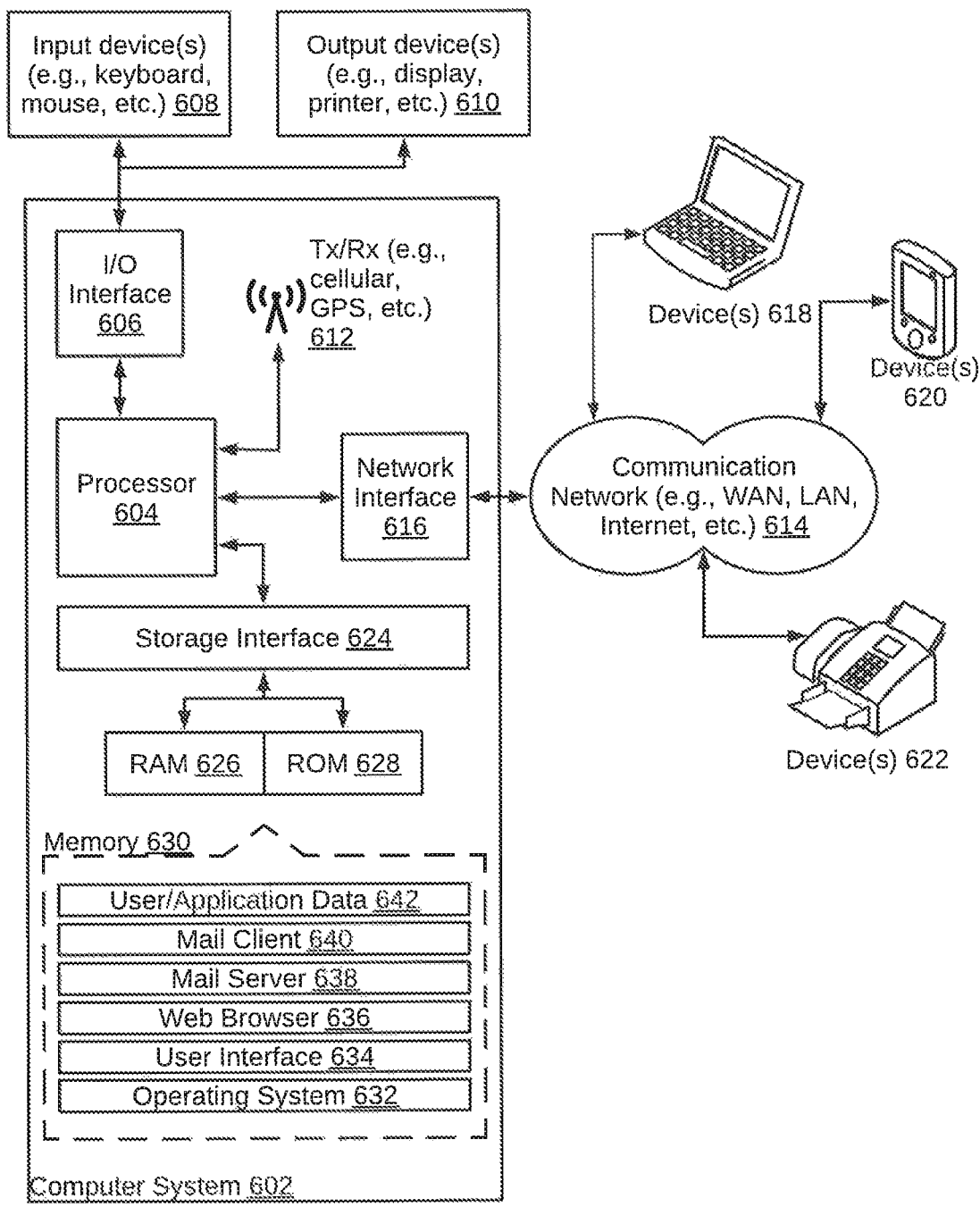
FIG. 6 illustrates a block diagram of an exemplary computer system for implementing embodiments consistent with the present disclosure.

FIG. 6 is a block diagram of an exemplary computer system for implementing various embodiments. Computer system 602 may include a central processing unit ("CPU" or "processor") 604. Processor 604 may include at least one data processor for executing program components for executing user- or system-generated requests. A user may include a person, a person using a device such as such as those included in this disclosure, or such a device itself. Processor 604 may include specialized processing units such as integrated system (bus) controllers, memory management control units, floating point units, graphics processing units, digital signal processing units, etc. Processor 604 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 604 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 604 may be disposed in communication with one or more input/output (I/O) devices via an I/O interface 606. I/O interface 606 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using I/O interface 606, computer system 602 may communicate with one or more I/O devices. For example, an input device 608 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/ source, visors, etc. An output device 610 may be a printer, fax machine, video display (e.g., cathode ray tube (CRT), liquid crystal display (LCD), light-emitting diode (LED), plasma, or the like), audio speaker, etc. In some embodiments, a transceiver 612 may be disposed in connection with processor 604. Transceiver 612 may facilitate various types of wireless transmission or reception. For example, transceiver 612 may include an antenna operatively connected to a transceiver chip (e.g., TEXAS® INSTRUMENTS WIL-INK WL1283® transceiver, BROADCOM® BCM4550IUB8® transceiver, INFINEON TECHNOLOGIES® X-GOLD 618-PMB9800® transceiver, or the like), providing IEEE 802.11a/b/g/n, Bluetooth, FM, global positioning system (GPS), 2G/3G HSDPAIHSUPA communications, etc.

In some embodiments, processor 604 may be disposed in communication with a communication network 614 via a network interface 616. Network interface 616 may communicate with communication network 614. Network interface 616 may employ connection protocols including, without limitation, direct connect, Ethernet (e.g., twisted pair 50/500/5000 Base T), transmission control protocol/internet protocol (TCP/IP), token ring, IEEE 802.11a/b/g/n/x, etc. Communication network 614 may include, without limitation, a direct interconnection, local area network (LAN), wide area network (WAN), wireless network (e.g., using Wireless Application Protocol), the Internet, etc. Using network interface 616 and communication network 614, computer system 602 may communicate with devices 618, 620, and 622. These devices may include, without limitation, personal computer(s), server(s), fax machines, printers, scanners, various mobile devices such as cellular telephones, smartphones (e.g., APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console. NINTENDO® DS® gaming console, SONY® PLAYSTATION® gaming console, etc.), or the like. In some embodiments, computer system 602 may itself embody one or more of these devices.

In some embodiments, processor 604 may be disposed in communication with one or more memory devices (e.g., RAM 626, ROM 628, etc.) via a storage interface 624. Storage interface 624 may connect to memory 630 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 630 may store a collection of program or database components, including, without limitation, an operating system 632, user interface application 634, web browser 636, mail server 638, mail client 640, user/application data 642 (e.g., any data variables or data records discussed in this disclosure), etc. Operating system 632 may facilitate resource management and operation of computer system 602. Examples of operating systems 632 include, without limitation, APPLE® MACINTOSH® OS X platform, UNIX platform, Unix-like system distributions (e.g., Berkeley Software Distribution (BSD), FreeBSD, NetBSD, OpenBSD, etc.), LINUX distributions (e.g., RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 634 may facilitate display, execution, interaction, manipulation, or operation of program components through textual or graphical facilities. For example, user interfaces may provide computer interaction interface elements on a display system operatively connected to computer system 602, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (e.g., AERO® platform, METRO® platform, etc.), UNIX X-WINDOWS, web interface libraries (e.g., ACTIVEX® platform, JAVA® programming language, JAVASCRIPT® programming language, AJAX® programming language, HTML, ADOBE® FLASH® platform, etc.), or the like.

In some embodiments, computer system 602 may implement a web browser 636 stored program component. Web browser 636 may be a hypertext viewing application, such as MICROSOFT® INTERNET EXPLORER® web browser, GOGGLE® CHROME® web browser, MOZILLA® FIREFOX® web browser, APPLE® SAFARI® browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APIs), etc. In some embodiments, computer system 602 may implement a mail server 638 stored program component. Mail server 638 may be an Internet mail server such as MICROSOFT® EXCHANGE® mail server, or the like. Mail server 638 may utilize facilities such as ASP, ActiveX, ANSI C++/C#, MICROSOFT .NET® programming language, CGI scripts, JAVA® programming language, JAVASCRIPT® programming language, PERL® programming language, PHP® programming language, PYTHON® programming language, WebObjects, etc. Mail server 638 may utilize communication protocols such as Internet message access protocol (IMAP), messaging application programming interface (MAPI), Microsoft Exchange, post office protocol (POP), simple mail transfer protocol (SMTP), or the like. In some embodiments, computer system 602 may implement a mail client 640 stored program component. Mail client 640 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 602 may store user/application data 642, such as the data, variables, records, etc. as described in this disclosure, Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (e.g., XML), table, or as object-oriented databases (e.g., using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments of the invention provide method and device for automating testing based on context parsing across multiple technology layers. The method enables efficient handling of context passing across plurality of technology layers, such as Web, Web services, Microservices, Databases, Mainframe, Mobile and Desktop-based thick client applications. Further, the method provides for identification and assimilation of context that is to be passed between different technology layers. Further, the method provides for standardizing and packaging of the context information for use by the different technology layers to thereby allow a seamless end to end execution of the process. Thus, the challenges associated with identification and assimilation of the context passing between different technology layers, and standardizing and packaging of the context information for use by different technology layers is overcome.

The specification has described method and device for automating testing based on context parsing across multiple technology layers. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for automating testing of an application across a plurality of technology layers, the method comprising:
   receiving, by a testing automation device, a plurality of test instructions for performing testing of the application, wherein each of the plurality of test instructions comprises at least one action and at least one object;
   clustering, by the testing automation device, the plurality of test instructions into a plurality of technology groups based on an analysis of the plurality of test instructions, wherein each technology group in the plurality of technology groups is associated with a technology layer from the plurality of technology layers, wherein the analysis of the plurality of test instructions comprising performing a textual comparison of an action in a test instruction with an action in a succeeding test instruction that succeeds the test instruction to determine a similarity score, comparing the similarity score with a predetermined threshold score; and determining whether the test instruction and the succeeding test instruction are to be clustered, based on the comparison of the similarity score with the predetermined threshold score;
   creating, by the testing automation device, an automation component for a set of test instructions in each of the plurality of technology groups, based on actions and objects in an associated set of test instructions;
   identifying for each technology group, by the testing automation device, a context information to be passed from an automation component associated with a technology layer to a downstream automation component associated with a succeeding technology layer, based on Natural Language Processing (NLP) of the plurality of test instructions; and
   executing, by the testing automation device, testing of the application based on the automation component created for each technology group and an associated context information to be passed to the downstream automation component.

2. The method of claim 1, wherein the clustering comprises:
   determining the plurality of technology layers based on at least one pre-identified keywords used in each of the plurality of test instructions;
   creating the plurality of technology groups based on the determined plurality of technology layers; and
   identifying whether a test instruction from the plurality of test instructions is associated with one of the plurality of technology groups, wherein the analysis comprises identifying the at least one pre-identified keywords in each of the plurality of test instructions.

3. The method of claim 1, wherein the determining comprises:
   clustering the test instruction and the succeeding test instruction in the same technology group from the plurality of technology groups, when the similarity score is greater than the predetermined threshold score; and
   assigning each of the test instruction and the succeeding test instruction to separate technology groups from the plurality of technology groups, when the similarity score is less than the predetermined threshold score.

4. The method of claim 1, wherein creating the automation component for a set of test instructions in a technology group from the plurality of technology groups comprises identifying at least one action and the corresponding at least one object in the set of test instructions based on NLP.

5. The method of claim 1, wherein identifying the context information to be passed from the automation component to the downstream automation component comprises:
   identifying context values in an output of the automation component;
   standardizing the context values across the plurality of technology layers as standardized context information.

6. The method of claim 5, wherein standardizing the context values comprises:
   identifying expression patterns in the context values;
   parsing the context values in the plurality of technology layers; and
   updating the context values across the plurality of technology layers as the standardized context information.

7. A testing automation device for automating testing of an application across a plurality of technology layers, the testing automation device comprising:
   a processor; and
   a memory communicatively coupled to the processor, wherein the memory stores processor instructions, which, on execution, causes the processor to:
   receive a plurality of test instructions for performing testing of the application, wherein each of the plurality of test instructions comprises at least one action and at least one object;
   cluster the plurality of test instructions into a plurality of technology groups based on an analysis of the plurality of test instructions, wherein each technology group in the plurality of technology groups is associated with a technology layer from the plurality of technology layers, wherein for the analysis of the plurality of test instructions, the processor instructions further cause the processor to perform a textual comparison of an action in a test instruction with an action in a succeeding test instruction that succeeds the test instruction to determine a similarity score, compare the similarity score with a predetermined threshold score, and determine whether the test instruction and the succeeding test instruction are to be clustered, based on the comparison of the similarity score with the predetermined threshold score;
   create an automation component for a set of test instructions in each of the plurality of technology groups, based on actions and objects in an associated set of test instructions;
   identify for each technology group a context information to be passed from an automation component associated with a technology layer to a downstream automation component associated with a succeeding technology layer, based on Natural Language Processing (NLP) of the plurality of test instructions; and
   execute testing of the application based on the automation component created for each technology group and an associated context information to be passed to the downstream automation component.

8. The testing automation device of claim 7, wherein for clustering, the processor instructions further cause the processor to:
   determine the plurality of technology layers based on at least one pre-identified keywords used in each of the plurality of test instructions;
   create the plurality of technology groups based on the determined plurality of technology layers; and
   identify whether a test instruction from the plurality of test instructions is associated with one of the plurality of technology groups, wherein the analysis comprises identifying the at least one pre-identified keywords in each of the plurality of test instructions.

9. The testing automation device of claim 7, wherein for determining, the processor instructions further cause the processor to:
   cluster the test instruction and the succeeding test instruction in the same technology group from the plurality of technology groups, when the similarity score is greater than the predetermined threshold score; and
   assign each of the test instruction and the succeeding test instruction to separate technology groups from the plurality of technology groups, when the similarity score is less than the predetermined threshold score.

10. The testing automation device of claim 7, wherein for creating the automation component for a set of test instructions in a technology group from the plurality of technology groups, the processor instructions further cause the processor to:
   identify at least one action and the corresponding at least one object in the set of test instructions based on NLP.

11. The testing automation device of claim 7, wherein for identifying the context information to be passed from the automation component to the downstream automation component, the processor instructions further cause the processor to:
   identify context values in an output of the automation component; and
   standardize the context values across the plurality of technology layers as standardized context information.

12. The testing automation device of claim 11, wherein to standardize the context values, the processor instructions further cause the processor to:
   identify expression patterns in the context values;
   parse the context values in the plurality of technology layers; and
   update the context values across the plurality of technology layers as the standardized context information.

13. A non-transitory computer-readable storage medium having stored thereon, a set of computer-executable instructions causing a computer comprising one or more processors to perform steps comprising:
   receiving a plurality of test instructions for performing testing of the application, wherein each of the plurality of test instructions comprises at least one action and at least one object;
   clustering the plurality of test instructions into a plurality of technology groups based on an analysis of the plurality of test instructions, wherein each technology group in the plurality of technology groups is associated with a technology layer from the plurality of technology layers, wherein the analysis of the plurality of test instructions comprising performing a textual comparison of an action in a test instruction with an action in a succeeding test instruction that succeeds the test instruction to determine a similarity score, comparing the similarity score with a predetermined threshold score;
   and determining whether the test instruction and the succeeding test instruction are to be clustered, based on the comparison of the similarity score with the predetermined threshold score;
   creating an automation component for a set of test instructions in each of the plurality of technology groups, based on actions and objects in an associated set of test instructions;

identifying for each technology group a context information to be passed from an automation component associated with a technology layer to a downstream automation component associated with a succeeding technology layer, based on Natural Language Processing (NLP) of the plurality of test instructions; and executing testing of the application based on the automation component created for each technology group and an associated context information to be passed to the downstream automation component.

* * * * *